United States Patent Office 3,072,649
Patented Jan. 8, 1963

3,072,649
3,4,5-TRIALKOXYCINNAMAMIDE DERIVATIVES

Joseph Semb and Guido Eros Bonvicino, Pearl River, N.Y., and Robert Allis Hardy, Jr., Ridgewood, N.J., assignors to American Cyanamid Company, New York, N.Y., a corporation of Maine
No Drawing. Filed Dec. 22, 1960, Ser. No. 77,526
6 Claims. (Cl. 260—240)

This invention relates to certain substituted 3,4,5-trialkoxycinnamamides and, more particularly, is concerned with novel deriavtives of cinnamamide which may be represented by the following general formula:

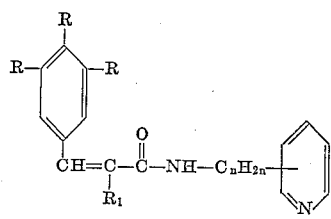

wherein R is lower alkoxy, $R_1$ is hydrogen or lower alkyl, and $n$ has the value of 0, 1, or 2. Suitable lower alkoxy substituents are methoxy and ethoxy. Suitable lower alkyl substituents are methyl, ethyl, propyl, isopropyl, etc. In the foregoing formula, $-C_nH_{2n}-$ represents a direct bond between the amide nitrogen and the 2-, 3-, or 4- position of the pyridine ring (where $n=0$), or a methylene group (where $n=1$), or an ethylene or ethylidene group (where $n=2$). The non-toxic acid-addition salts of the novel cinnamamide derivatives of the present invention with both organic and inorganic acids are also included within the scope of the invention.

Examples of non-toxic acid-addition salts of said free bases with inorganic and organic acids, which may be prepared by the methods hereinafter disclosed, are the hydrochloride, hydrobromide, sulfate, phosphate, acetate, citrate, oxalate, succinate, benzoate, tartrate, mandelate, malate, ascorbate, 8-chlorotheophyllinate, and the like.

The novel compounds of the present invention are, in general, white crystalline solids, soluble in chloroform, acetone, toluene, and the like, but sparingly soluble in water, lower alkanols, and the like. The non-toxic acid-addition salts of the novel compounds of the present invention are, in general, soluble in water and hot alkanols, but relatively insoluble in non-polar organic solvents such as benzene, ether, and the like.

The novel compounds of the present invention are useful pharmaceuticals. It has been discovered that these compounds possess desirable pharmacological properties and in particular are capable of producing a tranquillizing effect in man and animals with minimum side effects. The dosage required to produce a tranquillizing effect without noticeable toxic side effects varies between about 50 mg. and 500 mg. per individual dose. The dosage regimen may be adjusted to provide the optimum therapeutic response. For example, several doses may be administered daily, or the dose may be proportionately reduced as indicated by the exigencies of the therapeutic situation.

The novel compounds of the present invention may be readily prepared by the interaction of the appropriate 3,4,5-trialkoxycinnamoyl halide or 3,4,5-trialkoxy-α-(lower alkyl)cinnamoyl halide with an amine which may be represented by the following general formula:

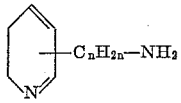

wherein $n$ is as defined above. The conversion of the cinnamic acids to the corresponding cinnamoyl halides may be carried out by means of various reagents. For this purpose there may be used phosphorus trichloride, phosphorus tribromide, phosphorus pentachloride, phosphorus pentabromide, phosphorus oxychloride, phosphorus oxybromide, sulfuryl chloride or thionyl chloride. However, we prefer to use thionyl chloride for the preparation of the corresponding intermediate 3,4,5-trialkoxycinnamoyl chloride and 3,4,5-trialkoxy-α-(lower alkyl)cinnamoyl chloride. The reaction may be carried out at temperatures ranging from about 20° C. to about 100° C. in the absence of a solvent or in a solvent which will not enter into the reaction under the conditions employed. Such solvents may be, for example, chloroform, methylene chloride, benzene, and the like. The resulting cinnamoyl halide is then treated with a pyridylamine such as defined above whereby the corresponding cinnamamide is obtained. This reaction may be carried out at temperatures ranging from about 0° C. to about 80° C. For convenience, it is preferred to carry out the reaction in a solvent which will not enter into the reaction under the conditions employed. Solvents which may be used, for example, are dioxane, tetrahydrofuran, pyridine, and bis-(2-methoxyethyl)ether. An acid acceptor such as sodium hydroxide, sodium carbonate, or potassium carbonate may also be employed. In some cases the pyridylamine may act as its own acid acceptor by employing a two-fold excess thereof. Pyridine may also be used as both the solvent and acid acceptor. A two-phase reaction in which the pyridylamine and the cinnamoyl halide are reacted in a chloroform solution vigorously stirred in contact with an aqueous solution of the acide acceptor is particularly advantageous.

The novel compounds of the present invention may also be readily prepared by the interaction of the appropriate 3,4,5-trialkoxycinnamic anhydride or 3,4,5-trialkoxy-α-(lower alkyl)cinnamic anhydride with an amine which may be represented by the following general formula:

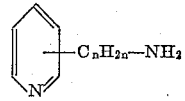

wherein $n$ is as defined above. The cinnamic anhydrides are prepared by the interaction of a 3,4,5-trialkoxycinnamic acid or a 3,4,5-trialkoxy-α-(lower alkyl)cinnamic acid with its corresponding cinnamoyl halide. The resulting cinnamic anhydride is then treated with an appropriate pyridylamine such as defined above. This reaction may be carried out at temperatures ranging from about 50° C. to about 100° C. Solvents which may be used, for example, are chloroform, toluene, and the like.

The novel compounds of the present invention may also be prepared by the interaction of the lower alkyl esters of the appropriate 3,4,5-trialkoxycinnamic acid or 3,4,5-trialkoxy-α-(lower alkyl)cinnamic acid with an amine which may be represented by the following general formula:

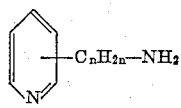

wherein $n$ is as defined above. The lower alkyl esters of 3,4,5-trialkoxycinnamic acid or 3,4,5-trialkoxy-α-(lower alkyl)cinnamic acid may be readily prepared by standard esterification procedures. The amidation of these intermediate cinnamic esters may be brought about by treatment with an appropriate pyridylamine such as defined above.

Treatment of the free bases of the novel compounds of the present invention with one equivalent of a non-toxic acid produces the non-toxic acid-addition salts.

The invention will be described in greater detail in conjunction with the following specific examples.

EXAMPLE 1

3,4,5-Trimethoxycinnamoyl Chloride

In 50 grams of thionyl chloride is dissolved 7 grams of 3,4,5-trimethoxycinnamic acid and the solution is refluxed for about two hours on a steam bath. The excess thionyl chloride is removed under reduced pressure whereby there is obtained crystalline 3,4,5-trimethoxycinnamoyl chloride.

EXAMPLE 2

N-(2-Pyridyl)-3,4,5-Trimethoxycinnamamide

A solution of 4.4 grams of 2-aminopyridine in 30 ml. of pyridine is stirred and externally cooled in an ice bath to 0° C., and 11.3 grams of 3,4,5-trimethoxycinnamoyl chloride is added gradually in small portions over a period of about 20 minutes. The solution is stirred for one hour and then allowed to stand at room temperature. The clear solution is poured into cold water whereupon the product solidifies. It is collected and washed with water. After recrystallization from alcohol, N-(2-pyridyl)-3,4,5-trimethoxycinnamamide, M.P. 134–135° C., is obtained.

EXAMPLE 3

N-(3-Pyridyl)-3,4,5-Trimethoxycinnamamide

A solution of 4.7 grams of 3-aminopyridine in 50 ml. of chloroform is vigorously stirred with a solution of 15.9 grams of sodium carbonate in 50 ml. of water. The mixture is chilled by external cooling and the temperature is maintained at about 10° C. while a solution of 14.1 grams of 3,4,5-trimethoxycinnamoyl chloride in 75 ml. of chloroform is added gradually over a period of about one-half hour. The mixture is stirred for an additional hour and allowed to come to room temperature. The organic layer is separated, washed with water and dried over anhydrous magnesium sulfate. The solvent is evaporated and the crude product is obtained as an amorphous solid residue. After purification by recrystallization from ethanol, the N-(3-pyridyl)-3,4,5-trimethoxycinnamamide thereby obtained melts at 191–192° C.

EXAMPLE 4

N-(4-Pyridyl)-3,4,5-Trimethoxycinnamamide

The procedure of Example 3 is followed using an identical amount of 4-aminopyridine in place of the 3-aminopyridine. The product is recrystallized successively from alcohol and petroleum ether. This material is then dissolved in hot 1 N hydrochloric acid, allowed to crystallize on cooling and finally the precipitate is recrystallized from ethanol. N-(4-pyridyl)-3,4,5-trimethoxycinnamamide hydrochloride, M.P. 223–226° C. (with decomposition), is thereby obtained.

EXAMPLE 5

N-(3-Pyridylmethyl)-3,4,5-Trimethoxycinnamamide

To a mixture of 1.8 grams of 3-aminomethylpyridine dihydrochloride in 25 ml. of bis-(2-methoxyethyl)ether is added 8 ml. of 5 N sodium hydroxide. The mixture is stirred and cooled in an ice bath during the addition of the sodium hydroxide. To this mixture is then added dropwise a solution of 2.6 grams of 3,4,5-trimethoxycinnamoyl chloride in 5 ml. of warm bis-(2-methoxyethyl) ether. After the addition is complete the reaction mixture is stirred at room temperature for about 30 minutes and then diluted with about 150 ml. of water. The solvent is removed by evaporation under reduced pressure and the residue is suspended in water. The crude product precipitates and is collected. After recrystallization from ethyl acetate, N-(3-pyridylmethyl)-3,4,5-trimethoxycinnamamide melts at 119–120° C. If desired, the hydrochloride salt, M.P. 215–216° C. (with decomposition), is prepared by treating a solution of the base in alcohol with anhydrous hydrogen chloride.

EXAMPLE 6

N-(2-Pyridylmethyl)-3,4,5-Trimethoxycinnamamide

The procedure of Example 5 is followed except that 3.6 grams of 2-aminomethylpyridine dihydrochloride is reacted with 5.1 grams of 3,4,5-trimethoxycinnamoyl chloride. When the reaction mixture is diluted with water the crude product precipitates and is collected. It is redissolved in ethanol, treated with alcoholic hydrogen chloride and then diluted wtih about an equal volume of ether. The precipitate is collected and recrystallized from ethanol thereby giving N-(2-pyridylmethyl)-3,4,5-trimethoxycinnamamide hydrochloride, M.P. 180–181° C. (with decomposition).

EXAMPLE 7

N-(4-Pyridylmethyl)-3,4,5-Trimethoxycinnamamide

The procedure of Example 5 is followed except that 3.6 grams of 4-aminomethylpyridine dihydrochloride is reacted with 5.1 grams of 3,4,5-trimethoxycinnamoyl chloride. When the reaction mixture is diluted with water the crude product precipitates and is collected. An alcoholic solution of this material is treated with anhydrous hydrogen chloride and N-(4-pyridylmethyl)-3,4,5-trimethoxycinnamamide hydrochloride, melt point 217–218° C. (with decomposition), is obtained.

EXAMPLE 8

N-[1-(3-Pyridyl)Ethyl]-3,4,5-Trimethoxycinnamamide

The procedure of Example 5 is followed except that 4.9 grams of 1-(3-pyridyl)ethylamine is reacted with 10.3 grams of 3,4,5-trimethoxycinnamoyl chloride. When the reaction mixture is diluted with water the crude product separates as an oil which slowly solidifies on standing. After recrystallization from alcohol, N-[1-(3-pyridyl)ethyl]-3,4,5-trimethoxycinnamamide, M.P. 164–166° C., is obtained.

EXAMPLE 9

N-[2-(4-Pyridyl)Ethyl]-3,4,5-Trimethoxycinnamamide

To a solution of 7.7 grams of 3,4,5-trimethoxycinnamoyl chloride in 50 ml. of chloroform, cooled in an ice bath, is gradually added a solution of 3.7 grams of 4-aminoethylpyridine and 3.0 grams of triethylamine in 40 ml. of chloroform. The mixture is heated at the refluxing temperature for about 15 minutes, is then cooled and washed twice with water. The organic layer is dried over anhydrous sodium sulfate and the solvent is evaporated giving a solid residue. After recrystallization from aqueous alcohol and then from benzene, N-[2-(4-pyridyl)ethyl]-3,4,5-trimethoxycinnamamide, M.P. 126–127° C., is obtained.

EXAMPLE 10

N-Methyl-N-(2-Pyridylmethyl)-3,4,5-Trimethoxycinnamamide

The procedure of Example 5 is followed except that 6.1 grams of 2-picolylmethylamine is reacted with 3,4,5-trimethoxycinnamoyl chloride. When the reaction mixture is diluted with water, precipitation does not take place. The mixture is then acidified with acetic acid, evaporated to a small volume under reduced pressure and made alkaline with sodium hydroxide. An oil separates and solidifies on standing. Recrystallization from toluene by the addition of ether gives N-methyl-N-(2-pyridylmethyl)-3,4,5-trimethoxycinnamamide, M.P. 116–118° C.

EXAMPLE 11

3,4,5-Trimethoxy-α-Methylcinnamoyl Chloride

The procedure of Example 1 is followed using 3,4,5- trimethoxy-α-methylcinnamic acid in place of 3,4,5-trimethoxycinnamic acid. The reaction proceeds smoothly and crystalline 3,4,5-trimethoxy-α-methylcinnamoyl chloride is thereby obtained.

EXAMPLE 12

*N-(3-Pyridyl)-3,4,5-Trimethoxy-α-Methylcinnamamide*

A mixture of 1.3 g. of 3-aminopyridine in 10 ml. of pyridine is cooled to 0° C. and 3.78 g. of 3,4,5-trimethoxy-α-methylcinnamoyl chloride is added portionwise with stirring and cooling over a period of about 20 minutes. After the addition is complete the mixture is stirred in the ice bath for an hour and allowed to stand overnight at room temperature. Evaporation of the solvent gives a viscous oil which is washed with petroleum-ether (B.P. 90–100° C.) and then crystallized from alcohol. The solid is washed with 10% sodium hydroxide solution and recrystallized twice from alcohol thereby giving a purified N-(3-pyridyl)-3,4,5-trimethoxy-α-methylcinnamamide, M.P. 109–110° C.

What is claimed is:

1. A member of the class consisting of a compound of the formula:

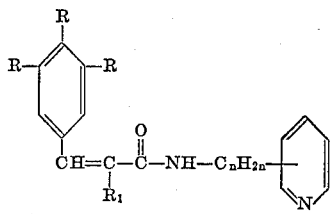

wherein R is lower alkoxy, $R_1$ is selected from the group consisting of hydrogen and lower alkyl, and $n$ has a value selected from the group consisting of 0, 1, and 2, and the non-toxic acid-addition salts thereof.

2. N-(3-pyridyl)-3,4,5-trimethoxycinnamamide.
3. N-(2-pyridylmethyl)-3,4,5-trimethoxycinnamamide.
4. N-(4-pyridylmethyl)-3,4,5-trimethoxycinnamamide.
5. N-methyl-N-(2-pyridylmethyl)-3,4,5-trimethoxycinnamamide.
6. N-(3-pyridyl)-3,4,5-trimethoxy-α-methylcinnamamide.

References Cited in the file of this patent

UNITED STATES PATENTS

| | | |
|---|---|---|
| 2,870,145 | Perron | Jan. 20, 1959 |
| 2,899,437 | Shapiro et al. | Aug. 11, 1959 |
| 2,987,544 | Horrom | June 6, 1961 |

OTHER REFERENCES

Degering: An Outline of Organic Nitrogen Compounds, University Lithoprinters, Ypsilanti, Michigan, 1950, pages 491–92.